United States Patent
Tian (10) Patent No.: US 11,520,327 B2
(45) Date of Patent: Dec. 6, 2022

(54) ELECTRIC POWER MOTION APPARATUS AND LEASE MANAGEMENT METHOD OF ELECTRIC POWER MOTION APPARATUS

(71) Applicant: YUJET INTERNATIONAL CORPORATION LIMITED, Central (HK)

(72) Inventor: Yu Tian, Hong Kong (HK)

(73) Assignee: YUJET INTERNATIONAL CORPORATION LIMITED, Central (HK)

( * ) Notice: Subject to any disclaimer, the term of this patent is extended or adjusted under 35 U.S.C. 154(b) by 727 days.

(21) Appl. No.: 16/378,128

(22) Filed: Apr. 8, 2019

(65) Prior Publication Data

US 2020/0097000 A1   Mar. 26, 2020

(30) Foreign Application Priority Data

Sep. 25, 2018   (CN) .......................... 201811114674.9

(51) Int. Cl.
*G05D 1/00* (2006.01)
*B60L 58/13* (2019.01)
(Continued)

(52) U.S. Cl.
CPC ............ *G05D 1/0027* (2013.01); *B60L 58/13* (2019.02); *G06Q 30/0645* (2013.01);
(Continued)

(58) Field of Classification Search
CPC .................................................... G05D 1/0027
See application file for complete search history.

(56) References Cited

U.S. PATENT DOCUMENTS

| 10,308,430 | B1 * | 6/2019 | Brady | .................. G05D 1/0278 |
| 2017/0217735 | A1 * | 8/2017 | Ibrahim | .................. B66B 31/02 |
| 2019/0217735 | A1 * | 7/2019 | Donnelly | ............. G05D 1/0088 |

FOREIGN PATENT DOCUMENTS

| CN | 102855703 B | * | 5/2013 | ............. G07B 15/00 |
| CN | 109615786 A | * | 4/2019 | |
| EP | 1538724 B1 | * | 9/2007 | ............ H02J 7/0075 |

OTHER PUBLICATIONS

English translation of Chinese Patent Pub No. 109615786 to Jiang.*
(Continued)

*Primary Examiner* — Jean Paul Cass
(74) *Attorney, Agent, or Firm* — WPAT Law, P.C.; Anthony King (57) ABSTRACT

A lease management method of an electric power motion apparatus includes acquiring location information, an advancement direction and a battery state of the electric power motion apparatus; additionally adjusting the advancement direction of the electric power motion apparatus to face towards the lease station such that the electric power motion apparatus faces towards the lease station based on normal adjustment and control if the electric power motion apparatus is located outside a lease range of a lease station; and additionally controlling the electric power motion apparatus to decelerate, and additionally adjusting the advancement direction of the electric power motion apparatus to face towards the lease station such that the electric power motion apparatus advances towards the lease station based on normal adjustment and control if a remaining power amount of the electric power motion apparatus approaches a power amount for returning to the lease station.

2 Claims, 4 Drawing Sheets

(51) Int. Cl.
*H04W 4/02* (2018.01)
*G06Q 30/06* (2012.01)

(52) U.S. Cl.
CPC ........... *H04W 4/026* (2013.01); *H04W 4/027* (2013.01); *G05D 2201/0213* (2013.01)

(56) References Cited

OTHER PUBLICATIONS

English translation of Chinese Patent Pub No. 102855703.*
English translation of Chinese Patent Pub No. CN207129115U.*

* cited by examiner

ELECTRIC POWER MOTION APPARATUS AND LEASE MANAGEMENT METHOD OF ELECTRIC POWER MOTION APPARATUS

CROSS-REFERENCE TO RELATED APPLICATIONS

This application claims priority to China Pat. No. 201811114674.9 filed on Sep. 25, 2018, which is hereby incorporated by reference in its entirety.

Although incorporated by reference in its entirety, no arguments or disclaimers made in the parent application apply to this divisional application. Any disclaimer that may have occurred during the prosecution of the above-referenced application is hereby expressly rescinded. Consequently, the Patent Office is asked to review the new set of claims in view of all of the prior art of record and any search that the Office deems appropriate.

TECHNICAL FIELD

Embodiments of the present invention relate to the technical field of lease management, and in particular, relate to an electric power motion apparatus, and a lease management method of the electric power motion apparatus.

BACKGROUND

Surfing is typically a sports item which depends on sea waves and struggles against the sea waves by using high technical skills and good balancing capability of a surfer. In the sea, a surfer has a place suitable for sea waves to lie on his or her back or sit on a surfboard to wait. When suitable sea waves gradually approach, the surfer adjusts the direction of the head of the surfboard, and lie on the back on the surfboard to paddle along the direction of the sea waves, which provides a sufficient speed for the surfboard such that the surfboard maintains at the front of the sea waves. When the sea waves push the surfboard to slide, the surfer stands up, with two legs naturally standing up and the knees being slightly bent. In this way, the surfer controls the way of the surfboard by using the center of gravity of the body, the shoulder and the rear legs. In addition, the surfing is further typically implemented depending on a force given by a boat, which is referred to as traction-based surfing.

With the development of science and technology, in recent years, electric water scooters are come into being. The electric water sliding board is practiced by adding an electric power apparatus on a conventional scooter, wherein the scooter is driven by a force provided by the electric power apparatus. In the electric water scooter, the direction still needs to be controlled based on the center of gravity of the body.

Transport sharing economy is now extending from vehicles, bikes and locomotives to various fields including the electric water scooters. However, with respect to lease of electric scooters currently, in the course of practicing the present invention, the inventors have found that the prior art at least has the following problems:

1. The electric scooter needs a large-capacity rechargeable battery to provide power to ensure normal operation. The rechargeable battery of the electric scooter is usually quickly consumed and the endurance thereof is very limited. With a fully-charged battery, the scooter may travel 20 to 30 km. However, the current electric scooter does not support checking the battery state thereof any time. The battery state mainly includes a remaining power amount and a charge and discharge cycle count. The charge and discharge cycle count of the battery is limited, and is generally 300 to 500. One cycle refers to a thorough charge and discharge. If the charge and discharge cycle count of the battery approaches or reaches the limit thereof, the battery may not store the power. If the remaining power amount is insufficient or the charge and discharge cycle count approaches or reaches the limit thereof, after the power of the battery is used up, the electric scooter may not return to a lease station. In addition, steering and cornering of the electric scooter are adjusted based on the center of gravity of the body of a driver. If the battery is used up, the direction of the electric scooter may not be controlled, such that it is hard for the electric scooter to advance.

2. With respect to lease of the electric scooter, a large number of electric scooters need to be maintained at the lease station. If no measures are taken to ensure operation of the electric scooters, a large number of manpower resources and device resources need to be configured to maintain normal operations and checks and repairs at the lease station.

3. The electric scooter needs to be operated within a lease range of the lease station. At present, during use by the user, if the electric scooter travels outside the lease range, the user may not perceive or no forcible measures for returning to the lease station are taken even if the user perceives that the scooter goes outside the lease range. As a result, the user may travel far away from the lease range with the scooter. If the scooter may not return to the lease station outside the lease range due to insufficient power, user experience is extremely poor.

It should be noted that the above description of the technical background is only intended to make the technical solutions of the present invention clearer and more complete, and to further facilitate understanding of the present invention by persons skill in the art. Although the technical solutions are elaborated in the background of the present invention, the above technical solutions shall not be considered as commonly known by persons skilled in the art.

SUMMARY

In view of the above problem, embodiments of the present invention are intended to provide an electric power motion apparatus and a lease management method of the electric power motion apparatus. According to the present invention, a battery state and location information of the electric power motion apparatus may be monitored in real time, such that lease management of the electric power motion apparatus is simple and convenient, and hence user experience is improved.

Embodiments of the present invention provide an electric power motion apparatus. The apparatus includes: a battery pack, a power unit, a lease control unit, an auxiliary steering unit and a controller; wherein the battery pack is configured to supply power for the electric power motion apparatus; the power unit is connected to the battery pack, and configured to propel the electric power motion apparatus and control a speed of the electric power motion apparatus under cooperation of the controller; and the lease control unit is connected to the power unit and the auxiliary steering unit, and configured to acquire location information, an advancement direction and a battery state of the electric power motion apparatus, and additionally adjust and control the electric power motion apparatus under cooperation of the auxiliary steering unit in addition to user adjustment and control.

In addition, the lease control unit includes a control CPU, a communication module, a GPS-based positioning module, a direction checking module and a direction indicating module; wherein the control CPU is connected to the communication module, the GPS-based positioning module, the direction checking module and the direction indicating module respectively, and is configured to acquire the location information of the electric power motion apparatus, acquire the advancement direction of the electric power motion apparatus from the direction checking module, and acquire the battery state of the battery pack via the electric power motion apparatus, wherein the battery state includes a remaining power amount and a charge and discharge cycle count.

In addition, the communication module is further configured to determine the lease station by the communication module based on the location information of the electric power motion apparatus acquired by the GPS-based positioning module, and control CPU is further configured to additionally adjust the advancement direction of the electric power motion apparatus to face towards the lease station such that the electric power motion apparatus advances towards the lease station under cooperation of the control CPU and the auxiliary steering unit if the control CPU determines that the electric power motion apparatus is located outside a lease range of the lease station.

In addition, the control CPU is configured to, when the electric power motion apparatus returns to the lease range of the lease station, cancel the additional adjustment and control of the electric power motion apparatus based on the location information of the electric power motion apparatus and the battery state of the electric power motion apparatus if the control CPU of the lease control unit determines that the remaining power amount of the electric power motion apparatus is greater than a power amount for returning to the lease station.

In addition, the lease control unit is further configured to, if the control CPU of the lease control unit determines that the remaining power amount of the electric power motion apparatus approaches a power amount for returning to the lease station, additionally control the electric power motion apparatus to decelerate by the power unit, and additionally adjust the advancement direction of the electric power motion apparatus to face towards the lease station such that the electric power motion apparatus advances towards the lease station based on the location information of the electric power motion apparatus and the battery state of the electric power motion apparatus.

In addition, the direction checking module is further configured to acquire the advancement direction of the current electric power motion apparatus, and the control CPU is further configured to calculate a direction difference for returning to the lease station based on the location information of the lease station; the direction indicating module is further configured to display a direction for returning the lease station for a user based on the calculated direction difference, such that the electric power motion apparatus adjusts the direction by perceiving a user behavior; the auxiliary steering unit is further configured to send an angle adjustment instruction to the control CPU based on the direction difference, such that the control CPU controls the electric power motion apparatus perform additional direction adjustment; and by the direction adjustment, the direction difference between the advancement direction of the electric power motion apparatus and the direction for returning to the lease station is gradually reduced until the direction difference reaches an allowable range.

Embodiments of the present invention further provide a lease management method of an electric power motion apparatus. The method includes: acquiring location information, an advancement direction and a battery state of the electric power motion apparatus; additionally adjusting the advancement direction of the electric power motion apparatus such that the electric power motion apparatus advances towards the lease station based on normal in addition to user adjustment and control if the electric power motion apparatus is located outside a lease range of a lease station; and additionally controlling the electric power motion apparatus to decelerate, and additionally adjusting the advancement direction of the electric power motion apparatus to face towards the lease station such that the electric power motion apparatus advances towards the lease station in addition to user adjustment and control if a remaining power amount of the electric power motion apparatus approaches a power amount for returning to the lease station, based on the acquired location information and battery state of the electric power motion apparatus.

Accordingly, with the electric power motion apparatus and the lease management method of the electric power motion apparatus according to the present invention, a lease control unit is additionally configured on the basis of the conventional electric power motion apparatus, such that the electric power motion apparatus may be leased, and whether the electric power motion apparatus is located in the lease range and whether the remaining power amount is sufficient for the electric power motion apparatus to return to the lease station are determined based on the location information, the advancement direction and the battery state of the electric power motion apparatus acquired by the lease control unit. In this way, when the electric power motion apparatus is located outside the lease range or the remaining power amount is insufficient for the electric power motion apparatus to return to the lease station, the electric power motion apparatus is additionally adjusted and controlled in addition to user adjustment and control, to ensure that the electric power motion apparatus is capable of successfully returning to the lease station. In this case, a large amount of manpower-based maintenance is not needed, such that lease management of the electric power motion apparatus is simple and convenient, and user experience is improved.

BRIEF DESCRIPTION OF THE DRAWINGS

For clearer description of the technical solutions according to the embodiments of the present invention or in the related art, hereinafter, drawings that are to be referred for description of the embodiments or the related art are briefly described. Apparently, the drawings described hereinafter merely illustrate some embodiments of the present invention. Persons of ordinary skill in the art may also derive other drawings based on the drawings described herein without paying any creative effort.

DETAILED DESCRIPTION

For clearer description of the objectives, technical solutions and advantages of the embodiments of the present application clearer, the technical solutions according to the embodiments of the present invention are clearly and thoroughly described with reference to the accompanying drawings of the embodiments of the present invention. The described embodiments are merely exemplary ones, but are not all the embodiments of the present invention. Based on the embodiments of the present invention, all other embodiments derived by persons of ordinary skill in the art without any creative efforts shall fall within the protection scope of the present invention. As used in the embodiments of the present invention and the appended claims, the singular forms "a", "an" and "the" are intended to include the plural forms as well, unless the context clearly indicates otherwise.

Figure 1:
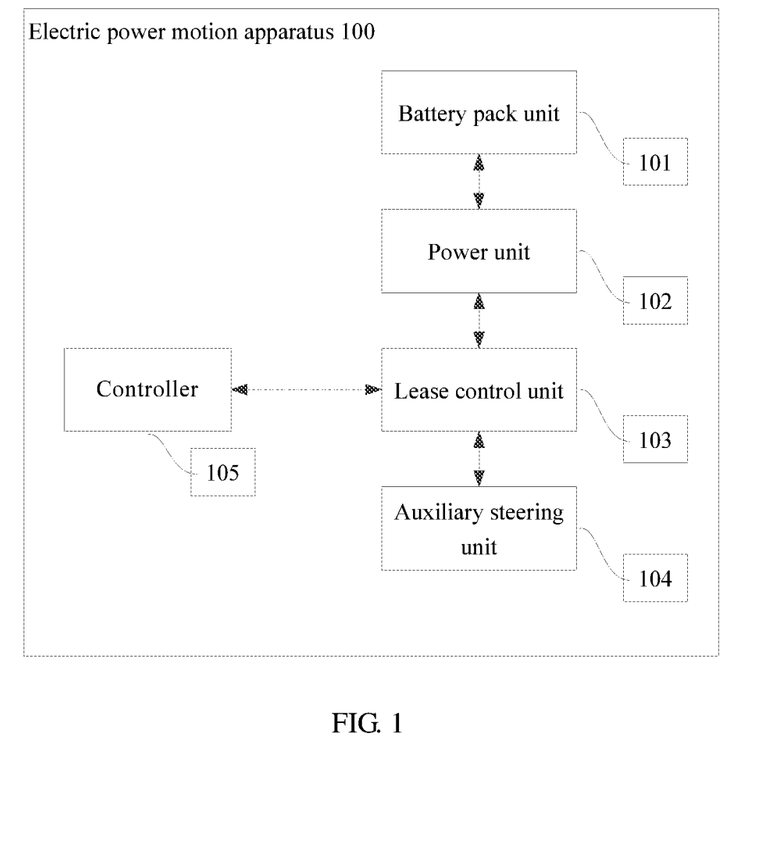
FIG. 1 is a schematic structural diagram of an electric power motion apparatus according to an embodiment of the present invention.

An embodiment of the present invention provides an electric power motion apparatus. In specific application, the electric power motion apparatus may be an electric scooter, or may be another type of electric power motion apparatus, which is not limited herein. As illustrated in FIG. 1, an electric power motion apparatus 100 includes a battery pack 101, a power unit 102, a lease control unit 103, an auxiliary steering unit 104 and a controller 105.

The battery pack is a rechargeable battery pack, and is configured to supply power for the electric power motion apparatus, wherein the rechargeable battery pack may be a lithium battery pack.

The power unit is connected to the battery pack, and units of the battery pack supply power for the power unit. The power unit is configured to propel the electric power motion apparatus and control a speed of the electric power motion apparatus under cooperation of the controller. The controller is preferably a remote controller, wherein the remote controller may control the power unit in a wireless remote control manner to control the electric power motion apparatus to decelerate or brake, and the remote controller may be wirelessly connected to the power unit by a 2.4 GHz wireless connection or Bluetooth connection.

The lease control unit is connected to the power unit and the auxiliary steering unit, and is configured to acquire location information, an advancement direction and a battery state of the electric power motion apparatus, and additionally adjust and control the electric power motion apparatus under cooperation of the auxiliary steering unit in addition to user adjustment and control when the power of the power unit is insufficient.

Figure 2:
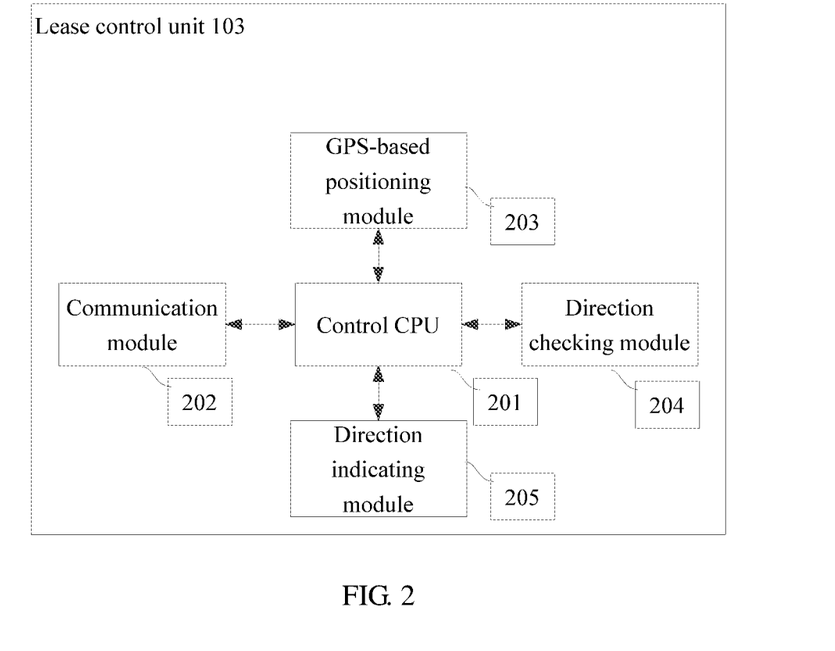
FIG. 2 is a schematic structural diagram of a lease control unit in the electric power motion apparatus according to an embodiment of the present invention.

In the embodiment of the present invention. With respect to the electric power motion apparatus for use in lease, the inventors innovatively adds a lease control unit, such that the electric power motion apparatus may still be effectively controlled after a user leases the electric power motion apparatus. The structure of the lease control unit is as illustrated in FIG. 2, and the lease control unit includes a control central processing unit (CPU) 201, a communication module 202, a global positioning system (GPS)-based positioning module 203, a direction checking module 204 and a direction indicating module 205.

Specifically, the control CPU is respectively connected to the communication module, the GPS-based positioning module, the direction checking module and the direction indicating module, and controls these modules.

The communication module is configured to communicate with a wireless gateway at the lease station. In the embodiment of the present invention, the communication module carries out long-distance communication, for example, narrowband spread spectrum communication, with the lease station by using, for example, the narrowband spread spectrum technology.

The GPS-based positioning module is configured to acquire the location information of the electric power motion apparatus. The GPS-based positioning module receives a positioning signal of a positioning satellite, acquires a location of the satellite, calculates a distance from the GPS-based positioning module to each satellite, and hence speculates a longitude and altitude-based location, time and operation state and the like location information of the electric power motion apparatus. In this way, real-time positioning may be provided.

The direction checking module is configured to acquire a current direction angle of advancement of the electric power motion apparatus by using a built-in direction sensor.

The direction indicating module is configured to display a direction for returning to a lease station for the user, and the direction indicating module is preferably a light-emitting diode (LED) which serves as a direction indication lamp.

Figure 3:
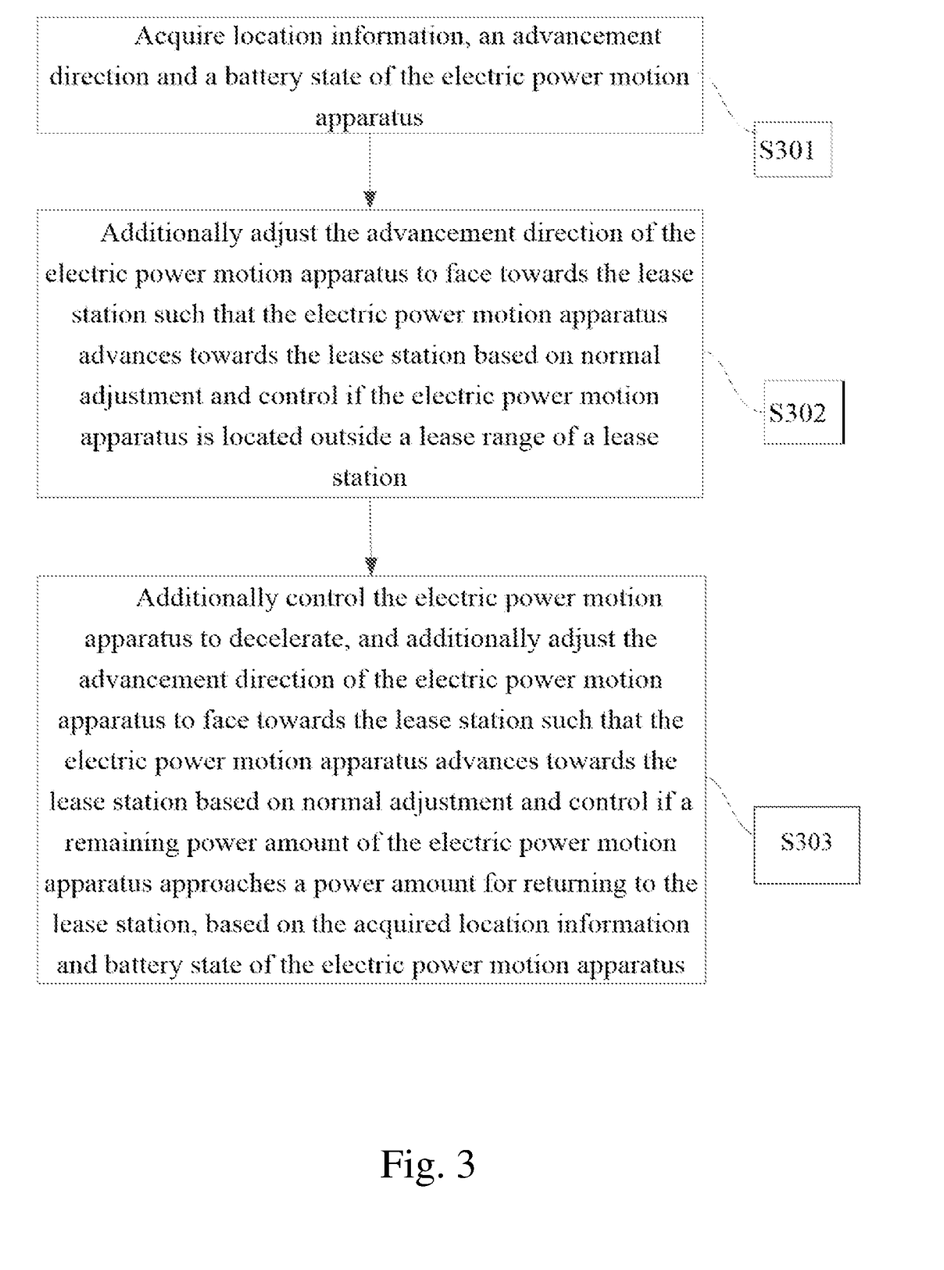
FIG. 3 is a flowchart of a lease management method of the electric power motion apparatus according to an embodiment of the present invention.

An embodiment of the present invention further provides a lease management method of an electric power motion apparatus. As illustrated in FIG. 3, the method includes the following steps:

Step S301: Location information, an advancement direction and a battery state of the electric power motion apparatus are acquired.

Step S302: Based on the location information of the electric power motion apparatus, the advancement direction of the electric power motion apparatus is additionally adjusted to face towards the lease station such that the electric power motion apparatus advances towards the lease station in addition to user adjustment and control if the electric power motion apparatus is located outside a lease range of a lease station.

Step S303: Based on the acquired location information and battery state of the electric power motion apparatus, the electric power motion apparatus is additionally controlled to decelerate, and the advancement direction of the electric power motion apparatus is additionally adjusted to face towards the lease station such that the electric power motion apparatus advances towards the lease station in addition to user adjustment and control if a remaining power amount of the electric power motion apparatus approaches a power amount for returning to the lease station.

Step S302 and step S303 may be performed exchangeably in terms of order. For example, whether the remaining power amount of the electric power motion apparatus approaches the power amount for returning to the lease station is determined firstly. Such definition that the remaining power amount of the electric power motion apparatus approaches a minimum power amount (the power amount for returning to a return range of the lease station) means that the remaining power amount of the electric power motion apparatus is less than or equal to a sum of the power amount for returning to the lease station and a predefined remaining power amount, or less than or equal to a product of the power amount for returning to the lease station and a predefined coefficient. If it is determined that the remaining power amount approaches the sum of the power amount for returning to the lease station and the predefined remaining power amount or the remaining power amount of the electric power motion apparatus approaches to the minimum power amount for returning to the lease station, in addition to user adjustment and control, the electric power motion apparatus is additionally controlled to decelerate, a speed in a power saving mode is used, the advancement direction of the electric power motion apparatus is additionally adjusted to face towards the lease station such that the electric power motion apparatus faces towards the lease station, and the electric power motion apparatus is controlled to return to the lease station. If it is determined that the remaining power amount is greater than the power amount for returning to the lease station, whether the electric power motion apparatus is located outside the lease range of the lease station is then determined. If it is determined that the electric power motion apparatus is located outside the lease range, the advancement direction of the electric power motion apparatus is adjusted to face towards the lease station such that the electric power motion apparatus advances towards the lease station; and if it is determined that the electric power motion apparatus is located within the lease range, the operation for the electric power motion apparatus is maintained.

Figure 4:
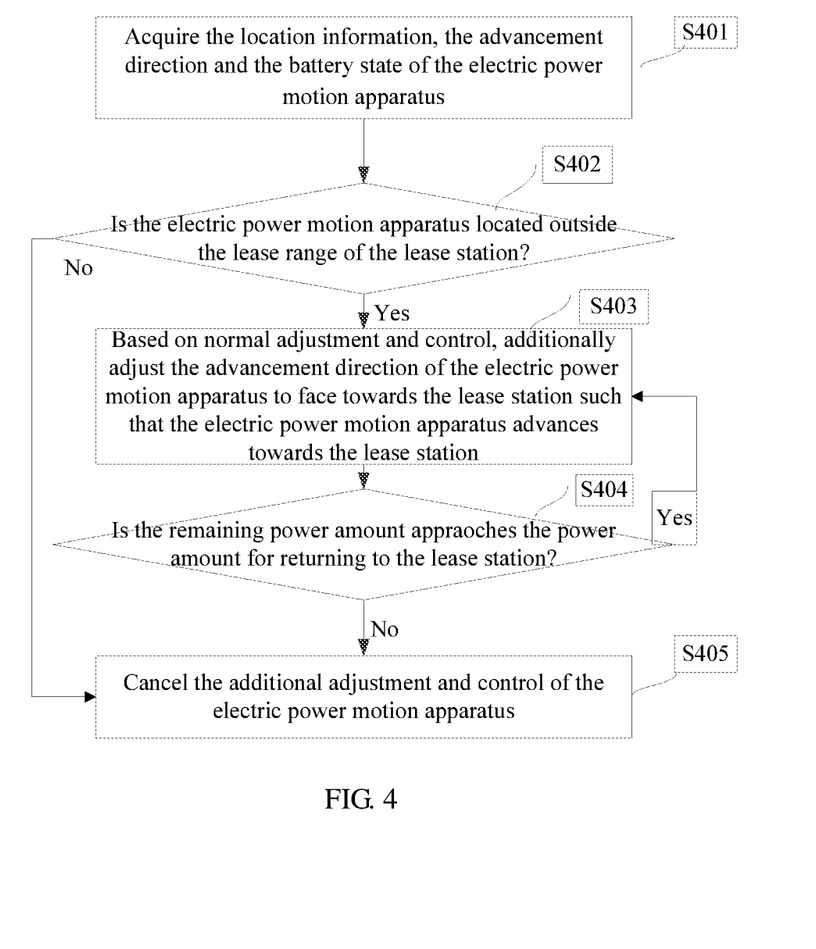
FIG. 4 is a detailed flowchart of the lease management method of the electric power motion apparatus according to an embodiment of the present invention.

Further, as illustrated in FIG. 4, a detail flowchart of the lease management method of the electric power motion apparatus according to the embodiment of the present invention includes the following steps:

Step S401: The location information, the advancement direction and the battery state of the electric power motion apparatus are acquired.

In this step, the location information of the electric power motion apparatus is acquired by using a GPS-based positioning module of the lease control unit, the advancement direction of the electric power motion apparatus is acquired by using a direction checking module of the lease control unit, and the battery state of the electric power motion apparatus is acquired by using a battery unit, wherein the battery state includes a remaining power amount and a charge and recharge cycle count.

Step S402: Whether the electric power motion apparatus is located outside the lease range of the lease station is determined. If the electric power motion apparatus is located outside the lease range of the lease station, step S403 is performed; and otherwise, step S404 is performed.

In this step, a leaser predefines the lease range of the lease station by using a control CPU of the lease control unit. For example, the lease range may be predefined as 2 km distal from the lease station. The current position of the electric power motion apparatus is acquired by using the GPS-based positioning module. The lease station to which the electric power motion apparatus belongs is determined. Specifically, the lease station may be determined as follows. For example, when the lease station is predefined, the lease station may be directly acquired; or when the lease station is not predefined, the lease station is searched by using a communication module. If the communication module detects a plurality of lease stations, a lease station may be selected by a user or a closest lease station may be automatically selected. The control CPU calculates a distance from the electric power motion apparatus to the lease station, and determines whether the electric power motion apparatus is within the predefined lease range.

Step S403: In addition to user adjustment and control, the advancement direction of the electric power motion apparatus is additionally adjusted to face towards the lease station such that the electric power motion apparatus advances towards the lease station.

In this step, if it is determined that the electric power motion apparatus is located outside the lease range, in addition to user adjustment and control, the advancement direction of the electric power motion apparatus is additionally adjusted to face towards the lease station such that the electric power motion apparatus faces towards the lease station under cooperation of the control CPU, an auxiliary steering unit, the direction checking module and a direction indicating module. Specifically, the direction checking module acquires the advancement direction of the electric power motion apparatus, the control CPU calculates a direction difference for returning to the lease station, and the auxiliary steering unit sends an angle adjustment instruction to the control CPU based on the direction difference such that the control CPU controls the electric power motion apparatus to be subjected to direction adjustment, and reduce the direction difference for returning to the lease station; while the auxiliary steering unit adjusts the angle, the direction indicating module displays the direction for returning to the lease station for the user based on the calculated direction difference, such that the control CPU perceives a user behavior (for example, by virtue of a center of gravity of the body) to adjust the advancement direction of the electric power motion apparatus), until a direction difference between the current advancement direction and the direction for returning to the lease station reaches an allowable range. The direction difference is preferably 0. That is, the advancement direction is the same as the direction for returning to the lease station. In this way, based on adjustment by the auxiliary steering unit and adjustment by the user under guidance of the direction indicating module, the advancement direction of the electric power motion apparatus may be quickly adjusted to a target direction of the lease station.

In an optional solution, a speed in a power saving mode is predefined; when it is determined that the electric power motion apparatus is located outside the lease range, the control CPU may further firstly control the power unit to cause the electric power motion apparatus to decelerate to the speed in the power saving mode. In this way, in one aspect, electric power of the units of the battery pack may be saved, and in another aspect, the user may be more effectively prompted to return to the lease range.

Step S404: Whether the remaining power amount approaches the power amount for returning to the lease station is determined; if the remaining power amount approaches the power amount for returning to the lease station, the process returns to step S403; and otherwise, step S405 is performed.

In this step, the location information and battery state of the electric power motion apparatus are acquired in real time. The distance from the electric power motion apparatus to the lease station is calculated, based on a relationship between energy consumption and a travel distance of the electric power motion apparatus, the minimum power amount for the electric power motion apparatus to cover the distance for returning to the lease station is calculated, and whether the remaining power amount approaches to the minimum power amount for returning to the lease station is determined.

Step S405: The additional adjustment and control of the electric power motion apparatus are canceled.

In this step, if the remaining power amount of the electric power motion apparatus within the lease range of the lease station is greater than the power amount for returning to the lease station, it indicates that the power is sufficient for the electric power motion apparatus to travel. In this case, the additional adjustment and control of the electric power motion apparatus may be canceled. The additional adjustment and control include direction adjustment and/or deceleration control.

In addition, in the embodiment of the present invention, the method may further include determining whether the charge and discharge cycle count is greater than a predefined cycle count; and if the charge and discharge cycle count is greater than the predefined cycle count, the battery pack needs to be replaced.

In summary, in the lease management method of the electric power motion apparatus according to the present invention, the location information, the advancement direction and the battery state of the electric power motion apparatus are acquired; the lease range of the lease station is predefined; the location information of the electric power motion apparatus is acquired in real time, the lease station is determined based on the location information of the electric power motion apparatus, and the distance from the electric power motion apparatus to the lease station is calculated; and if it is determined based on the distance that the electric power motion apparatus is located outside the lease range, in addition to user adjustment and control, the advancement direction of the electric power motion apparatus is additionally adjusted to face towards the lease station such that the electric power motion apparatus advances towards the lease station. The location information and battery state of the electric power motion apparatus are acquired in real time; the distance from the electric power motion apparatus to the lease station is calculated, and the minimum power amount for the electric power motion apparatus to cover the distance for returning to the lease station is calculated; when the electric power motion apparatus returns to the lease range of the lease station, if the remaining power amount of the electric power motion apparatus approaches the minimum power amount for returning to the lease station, the electric power motion apparatus is additionally controlled to decelerate to the speed in the power saving mode, and the advancement direction of the electric power motion apparatus is additionally adjusted to face towards the lease station such that the electric power motion apparatus advances towards the lease station. The additionally adjusting the advancement direction of the electric power motion apparatus to face towards the lease station includes: acquiring the current advancement direction of the electric power motion apparatus, and calculating the direction difference for returning to the lease station based on the location of the lease station; displaying the direction for the returning to the lease station for the user based on the calculated direction difference, and adjusting the direction by perceiving the user behavior; controlling the electric power motion apparatus to be subjected to additional direction adjustment based on the calculated direction difference; and by direction adjustment, gradually reducing the direction difference between the advancement direction of the electric power motion apparatus and the direction for returning to the lease station, until the direction difference reaches the allowable range. The specific technical details involved in the lease management method of the electric power motion apparatus are similar to those in the electric power motion apparatus. The technical effects achieved in the embodiments of the electric power motion apparatus are likewise achieved in the embodiments of the lease management method of the electric power motion apparatus. The details are not given herein any further for brevity. Correspondingly, the relevant technical details mentioned in the embodiments of the lease management method of the electric power motion apparatus may also be applied to the embodiments of the electric power motion apparatus.

Accordingly, in the electric power motion apparatus and the lease management method of the electric power motion apparatus according to the present invention, the lease control unit and the auxiliary steering unit are additionally configured in the electric power motion apparatus, the lease control unit includes the control CPU, the central processing unit, the communication module, the GPS-based positioning module, the direction checking module and the direction indicating module, such that the location, direction and remaining power amount of the electric power motion apparatus may be acquired in real time. In this way, where the electric power motion apparatus is located outside the lease range or the remaining power amount is insufficient, the electric power motion apparatus is timely adjusted and controlled such that the electric power motion apparatus is ensured to successfully return to the lease station.

Adjustment of the electric power motion apparatus mainly covers two cases. In one case, when the power amount of the battery pack is sufficient, if the user drives the electric power motion apparatus to reach a place outside the lease range, the direction may only need to be adjusted. That is, the travel direction of the electric power motion apparatus is adjusted to face towards to the lease station, such that the electric power motion apparatus returns to the lease range. Nevertheless, for power saving, the electric power motion apparatus may also decelerate. In another case, regardless of whether the user drives the electric power motion apparatus to reach a place outside the lease range or reach a place within the lease range, when the power amount of the battery pack is insufficient, both the power amount and the distance need to be considered. That is, the travel direction of the electric power motion apparatus is adjusted to face towards the lease station and meanwhile the electric power motion apparatus decelerate, to ensure that the electric power motion apparatus is capable of successfully returning to the lease station.

Various embodiments in the specification are described in a progressive manner. The same or similar parts between the embodiments may be referenced to each other. In each embodiment, the portion that is different from other embodiments is concentrated and described.

Finally, it should be noted that, the above descriptions of the embodiments of the present invention are provided for demonstration to persons skilled in the art, instead of exhaustively listing all the embodiments or limiting the present invention to a single disclosed embodiment. In view of the above, various replacements and variations to the present invention are apparent to persons skilled in the art. Therefore, although some alternative embodiments have been discussed in detail, other embodiments are apparent or can be readily derived by a person skilled in the art. The present application is intended to cover all the replacements, modifications and variations to the present invention that have been discussed here as well as other embodiments consistent with the spirit and scope of the present invention.

What is claimed is:

1. An electric surfboard, comprising: a battery pack, a power unit, a lease control unit, an auxiliary steering unit and a controller; wherein
   the battery pack is configured to supply power for the electric surfboard;
   the power unit is connected to the battery pack, and configured to propel the electric surfboard and control a speed of the electric surfboard under cooperation of the controller;
   the lease control unit includes a control CPU, and the control CPU is configured to acquire a charge and discharge cycle count of the battery pack; and the lease control unit is connected to the power unit and the auxiliary steering unit, and configured to acquire location information, an advancement direction and a battery state of the electric surfboard, and additionally adjust and control the electric surfboard under cooperation of the auxiliary steering unit in addition to a user adjustment and control;

wherein the lease control unit comprises a communication module, a GPS-based positioning module, a direction checking module and a direction indicating module;

wherein the communication module is configured to carry out long-distance communication with a wireless gate of at a lease station;

wherein the GPS-based positioning module is configured to acquire the location information of the electric surfboard;

wherein the direction checking module is configured to acquire the advancement direction of the current electric surfboard;

wherein the direction indicating module is configured to display a direction for returning to the lease station;

wherein the control CPU is connected to the communication module, the GPS-based positioning module, the direction checking module and the direction indicating module respectively, and is configured to acquire the location information of the electric surfboard, acquire the advancement direction of the electric surfboard from the direction checking module, and acquire the battery state of the battery pack via the electric surfboard, wherein the battery state comprises a remaining power amount;

wherein the communication module is further configured to determine the lease station by the communication module, and control CPU is further configured to additionally adjust the advancement direction of the electric surfboard to face towards the lease station such that the electric surfboard advances towards the lease station under cooperation of the control CPU and the auxiliary steering unit if the control CPU determines that the electric surfboard is located outside a lease range of the lease station;

wherein the lease control unit is further configured to, if the control CPU of the lease control unit determines that the remaining power amount of the electric surfboard approaches a power amount for returning to the lease station, additionally control the electric surfboard to decelerate by the power unit, and additionally adjust the advancement direction of the electric surfboard to face towards the lease station such that the electric surfboard advances towards the lease station based on the location information of the electric surfboard and the battery state of the electric surfboard.

2. The electric surfboard according to claim 1, wherein the control CPU is configured to, when the electric surfboard returns to the lease range of the lease station, cancel the additional adjustment and control of the electric surfboard based on the location information of the electric surfboard and the battery state of the electric surfboard if the control CPU of the lease control unit determines that the remaining power amount of the electric surfboard is greater than a power amount for returning to the lease station.

\* \* \* \* \*